(12) United States Patent
Park et al.

(10) Patent No.: US 12,050,029 B2
(45) Date of Patent: Jul. 30, 2024

(54) FILTER ASSEMBLY STRUCTURE AND WATER HEATER INCLUDING THE SAME

(71) Applicant: KYUNGDONG NAVIEN CO., LTD., Gyeonggi-do (KR)

(72) Inventors: Jun Kyu Park, Seoul (KR); Choong Gon Lee, Seoul (KR)

(73) Assignee: KYUNGDONG NAVIEN CO., LTD, Gyeonggi-Do (KR)

( * ) Notice: Subject to any disclaimer, the term of this patent is extended or adjusted under 35 U.S.C. 154(b) by 316 days.

(21) Appl. No.: 17/022,347

(22) Filed: Sep. 16, 2020

(65) Prior Publication Data
US 2021/0095889 A1   Apr. 1, 2021

(30) Foreign Application Priority Data
Sep. 30, 2019  (KR) ........................ 10-2019-0120513

(51) Int. Cl.
*F24H 9/00*   (2022.01)
*B01D 46/00*   (2022.01)
(Continued)

(52) U.S. Cl.
CPC ....... *F24H 9/0005* (2013.01); *B01D 46/0004* (2013.01); *B01D 46/0006* (2013.01);
(Continued)

(58) Field of Classification Search
CPC ..... F24H 9/0005; F24H 9/02; B01D 46/0004; B01D 46/0006; B01D 46/0086; B01D 46/16; B01D 46/4227; B01D 2271/02
See application file for complete search history.

(56) References Cited

U.S. PATENT DOCUMENTS 7,178,410 B2 * 2/2007 Fraden .................... G01F 1/696
                                                          73/861.52
10,137,391 B2   11/2018 Burns et al.
(Continued)

FOREIGN PATENT DOCUMENTS

CN   203615570 U   *  5/2014
CN   203615570 U      5/2014
(Continued)

OTHER PUBLICATIONS

Liberty Hardware. "Liberty D68816C-W-TS 16-Inch Bottom Mount Drawer Slide". First Available Nov. 21, 2011. Amazon.com. (https://www.amazon.com/Liberty-D68816C-W-TS-16-Inch-Bottom-Drawer/dp/B0064MDOXI). (Year: 2022).*
(Continued)

*Primary Examiner* — Edelmira Bosques
*Assistant Examiner* — Brett Peterson Mallon
(74) *Attorney, Agent, or Firm* — McDonald Hopkins LLC

(57) ABSTRACT

A filter assembly structure and a water heater including the same are provided. The filter assembly structure includes a filter housing coupled to an inner surface of a base panel provided in a case of a water heater, and including a flow space formed together with the inner surface of the base panel and an entrance to communicate with the flow space, and a filter assembly detachably assembled with the filter housing and including an air filter to filter air introduced through an air inlet provided in the base panel. The filter assembly is provided in a slide structure and inserted into or separated from the filter housing through the entrance.

19 Claims, 7 Drawing Sheets

(51) Int. Cl.
    *B01D 46/16*       (2006.01)
    *B01D 46/42*       (2006.01)
    *F24H 9/02*        (2006.01)

(52) U.S. Cl.
    CPC ......... *B01D 46/0086* (2013.01); *B01D 46/16* (2013.01); *B01D 46/4227* (2013.01); *F24H 9/02* (2013.01); *B01D 2271/02* (2013.01)

(56) References Cited

U.S. PATENT DOCUMENTS

| | | | |
|---|---|---|---|
| 10,259,293 B2 * | 4/2019 | Schumacher | B01D 46/10 |
| 10,309,686 B2 | 6/2019 | Nagasaka et al. | |
| 2010/0186358 A1 | 7/2010 | Xu et al. | |
| 2011/0296806 A1 | 12/2011 | Krisko et al. | |
| 2013/0062273 A1 | 3/2013 | Burns et al. | |
| 2014/0013720 A1 * | 1/2014 | Huang | B01D 46/0005 55/480 |
| 2017/0151519 A1 * | 6/2017 | Wu | B01D 46/10 |
| 2017/0276400 A1 | 9/2017 | Hugues et al. | |
| 2018/0245816 A1 * | 8/2018 | Nagasaka | F23D 14/02 |

FOREIGN PATENT DOCUMENTS

| | | | | |
|---|---|---|---|---|
| CN | 206055937 U | | 3/2017 | |
| EA | 032033 B1 | | 3/2019 | |
| EP | 2009371 A1 | * | 12/2008 | |
| JP | 2001293318 A | * | 10/2001 | ......... B01D 39/1623 |
| KR | 10-1997-0011366 A | | 3/1997 | |
| KR | 10-2004-0050022 A | | 6/2004 | |
| KR | 20110052851 A | * | 5/2011 | |
| KR | 10-2018-0099545 A | | 9/2018 | |
| KR | 10-1902455 B1 | | 9/2018 | |
| KR | 10-1927264 B1 | | 12/2018 | |
| KR | 101927264 B1 | * | 12/2018 | |
| RU | 168562 U1 | | 9/2016 | |
| SU | 821863 A1 | | 4/1981 | |

OTHER PUBLICATIONS

English translation of KR20110052851A, dated Sep. 22, 2022. (Year: 2022).*

English translation of JP-2001293318-A, dated Sep. 22, 2022. (Year: 2022).*

English translation of KR101927264B1, dated Sep. 22, 2022. (Year: 2022).*

English translation of CN-203615570-U, dated Sep. 22, 2022. (Year: 2022).*

Office Action of corresponding Russian Patent Application No. 2020132028 dated Dec. 8, 2020, 9 pages.

Office Action of corresponding Korean Patent Application No. 10-2019-0120513 dated Aug. 24, 2022, 5 pages.

Notice of Preliminary Rejection of corresponding Korean Patent Application No. 10-2019-0120513 dated Dec. 5, 2022, 9 pages.

Office Action of corresponding Korean Patent Application No. 10-2019-0120513 dated Feb. 25, 2022, 9 pages.

Notification of Third Party Submission for related Korean Patent Application No. 10-2019-0120513 dated Feb. 25, 2022, 2 pages long.

* cited by examiner

FILTER ASSEMBLY STRUCTURE AND WATER HEATER INCLUDING THE SAME

CROSS-REFERENCE TO RELATED APPLICATION

This application claims the benefit of priority to Korean Patent Application No. 10-2019-0120513, filed in the Korean Intellectual Property Office on Sep. 30, 2019, the entire contents of which are incorporated herein by reference.

TECHNICAL FIELD

The present disclosure relates to a filter assembly structure and a water heater including the same, and more particularly to a filter assembly structure capable of facilitating replacement of a filter and cleaning, and of improving airtightness, and a water heater including the same.

BACKGROUND

In general, a water heater, such as a boiler, has an air inlet to introduce external air therein. In addition, a filter net is provided inside a case of the water heater to filter the air introduced through the air inlet.

FIG. 1 illustrates that a conventional filter mounting member 1 is mounted in a water heater 10. An air inlet 15 may be formed in a base panel 13 serving as a top plate of a case 11 provided in the conventional water heater 10, and the air introduced through the air inlet 15 may be introduced into an inner space "S" of the case 11. In addition, the filter mounting member 1 is coupled to the inner surface of the base panel 13, and a filter net 2 of the filter mounting member 1 is provided in the air inlet 15 to filter out foreign matters from the introduced air.

However, the conventional filter net 2 is provided in an iron structure, so only dust or foreign matters having a specific size (e.g., 1.5×1.3 mm) are filtered out of the introduced air. Therefore, as foreign matters having less than the specific size are introduced and accumulated in the case 11, the foreign matters may be infiltrated into a heat exchanger and a burner part. Accordingly, the water heater of the boiler may be degraded in combustion function, the performance of the boiler, or the lifespan of the boiler.

Further, in the conventional filter mounting member 1, air tightness is not sufficiently made in the case 11, so air, foreign matters, and dust may be infiltrated into the case 11 through a path other than the filter net 2.

SUMMARY

The present disclosure has been made to solve the above-mentioned problems occurring in the prior art while advantages achieved by the prior art are maintained intact.

An aspect of the present disclosure provides a filter assembly structure capable of facilitating cleaning, replacement, or repair of an air filter by easily mounting/separating a filter assembly, and a water heater having the same.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a filter assembly structure includes a filter housing coupled to an inner surface of a base panel provided in a case of a water heater, and including a flow space formed together with the inner surface of the base panel and an entrance to communicate with the flow space, and a filter assembly detachably assembled with the filter housing and including an air filter to filter air introduced through an air inlet provided in the base panel. The filter assembly is provided in a slide structure and inserted into or separated from the filter housing through the entrance.

A water heater includes a case having an inner space formed in the case, and including a base panel to cover an upper portion of the inner space, in which the base panel includes an air inlet formed through the base panel such that air is introduced into the inner space, a filter housing coupled to the inner surface of the base panel and including a flow space formed together with the inner surface of the base panel and an entrance to communicate with the flow space, and a filter assembly detachably assembled with the filter housing and including an air filter to filter air introduced through the air inlet. The filter assembly is inserted into the filter housing or spaced apart from the filter housing in a slide structure through the entrance.

As described above, according to the present disclosure, when the filter assembly structure is used, the filter assembly is easily mounted in the case or separated from the case, such that the air filter is easily separated when the air filter needs to be cleaned, replaced, or repaired.

In particular, according to the present disclosure, when the filter assembly structure is used for the water heater, such as a boiler, the filter assembly may be easily mounted or separated from the case such that the state of the air filter is frequently checked. Accordingly, the penetration of dust into the heat exchanger or burner inside the case due to filter contamination is minimized, thereby improving the performance of the water heater and extending the lifespan of the water heater.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described with reference to accompanying drawings.

Embodiments to be described below are embodiments appropriate to allow those skilled in the art to understand technical features of a filter assembly structure and a water heater having the same according to the present disclosure. However, the present disclosure or the features of the present disclosure is not limited to embodiments to be described below, and various modifications are possible within the technical scope of the present disclosure.

Figure 1:
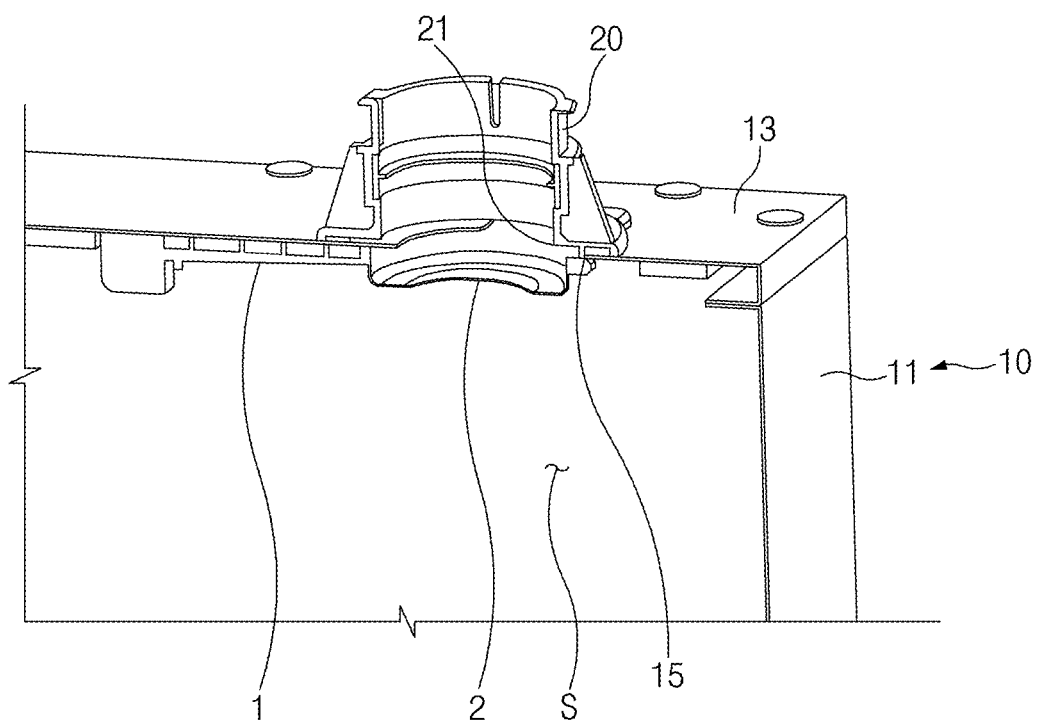
FIG. 1 is an enlarged sectional view illustrating the state that a filter net is provided in a conventional water heater.
Figure 2:
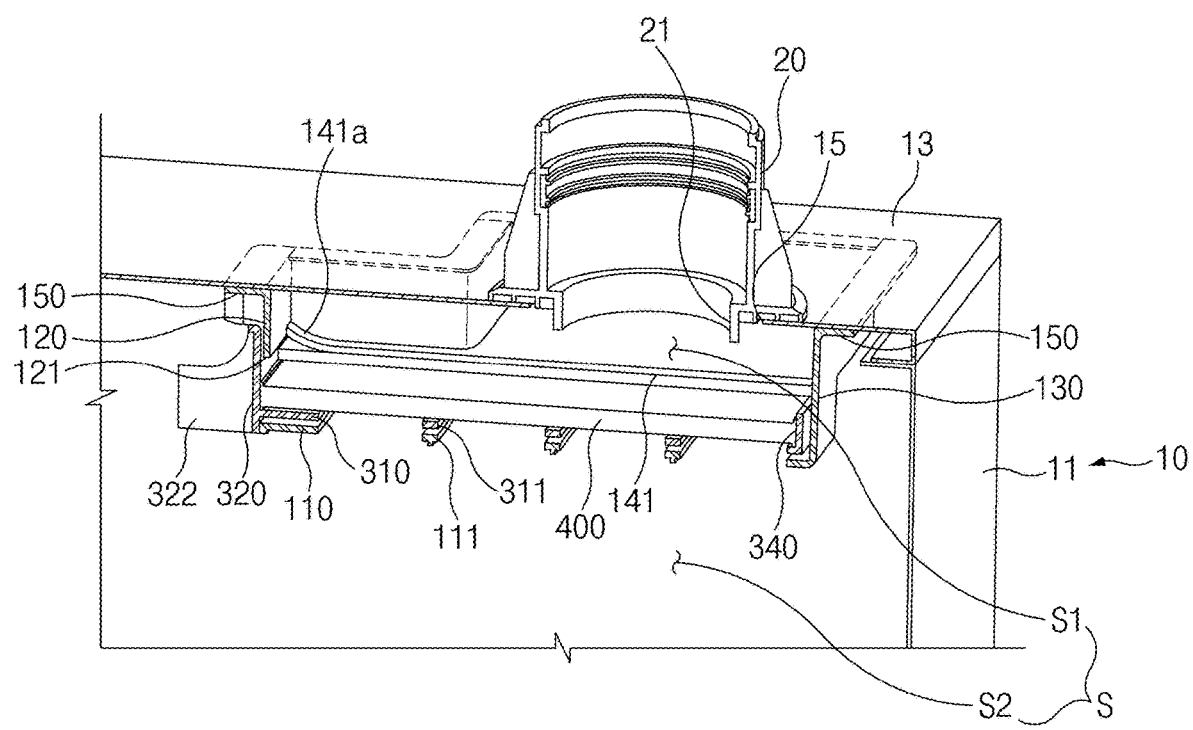
FIG. 2 is a partially-enlarged sectional perspective view of a filter assembly mounted in a water heater, according to the present disclosure.
Figure 3:
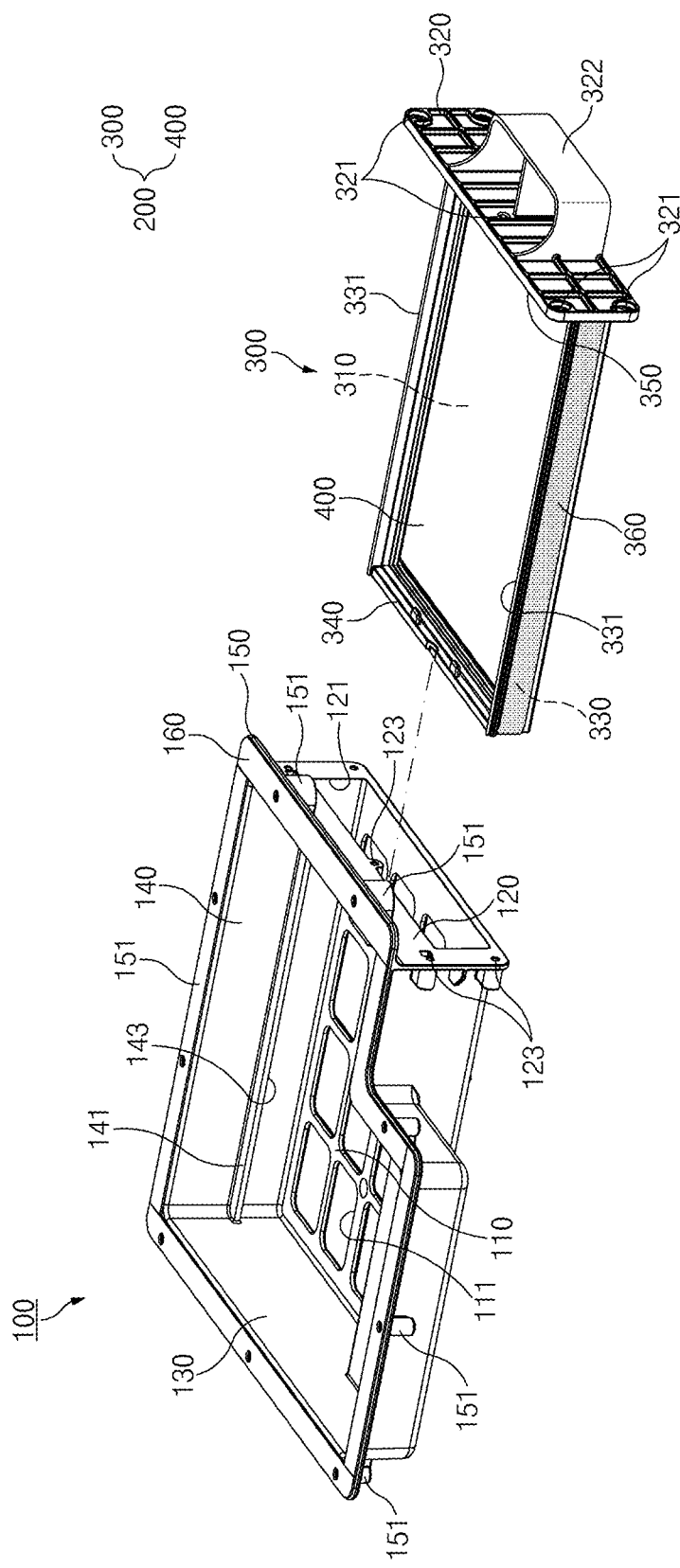
FIG. 3 is a perspective view illustrating a filter assembly separated from a filter housing.

Referring to FIGS. 2 and 3, according to the present disclosure, a filter assembly structure includes a filter housing 100 and a filter assembly 200.

A case 11 has an inner space "S" formed in the case 11, and includes a base panel 13 to cover an upper portion of the inner space "S", and the base panel 13 includes the air inlet 15 formed through the base panel 13 such that air is introduced into the inner space "S".

The filter housing 100 is coupled to the inner surface of the base panel 13 provided in the case 11 of the water heater 10, and includes a flow space "S1" formed together with the inner surface of the base panel 13 and an entrance 121 to communicate with the flow space "S1". In detail, the filter housing 100 may be coupled to the inner surface, which is adjacent to the air inlet 15, of the base panel 13, and may be coupled to the inner surface of the base panel 13 through various manners without limitation.

The filter assembly 200 is detachably assembled with the filter housing 100 and includes an air filter 420 that filters air introduced through the air inlet 15 provided in the base panel 13. The filter assembly 200 is provided in a slide structure and inserted into or separated from the filter housing 100 through the entrance 121.

Hereinafter, the filter assembly structure including the filter housing 100 and the filter assembly 200 will be described.

The filter housing 100 is coupled to the inner surface of the base panel 13 provided in the case 11 of the water heater 10, and includes the flow space "S1" formed together with the inner surface of the base panel 13 and the entrance 121 to communicate with the flow space "S1".

The filter assembly 200 is detachably assembled with the filter housing 100 and includes the air filter 420 that filters air introduced through the air inlet 15 provided in the base panel 13. In addition, the filter assembly 200 is provided in a slide structure and inserted into or separated from the filter housing 100 through the entrance 121.

In detail, the filter housing 100 may include the flow space "S1" and the entrance 121 to communicate with the flow space "S1", and the filter assembly 200 is at least partially inserted into the flow space "S1" through the entrance 121 and assembled with the filter housing 100. In addition, the filter assembly 200 is detachably assembled with the filter housing 100 and is provided in the slide structure to be separated from the filter housing 100.

Herein, for the convenience of explanation, the inner space "S" of the case 11 is classified into the flow space "S1" between the base panel 13 and the filter housing 100 and a supply space "S2", which is provided outside the flow space "S1", in the inner space "S". In other words, the supply space "S2" is provided outside the flow space "S2" in the inner space "S". The filter housing 100 may include a first opening 111 to supply air, which is introduced into the flow space "S1" through the air inlet 15, to the supply space "S2". In other words, the air introduced through the air inlet 15 may move from the flow space "S1" to the supply space "S2" through the first opening 111.

The air filter 420 may be disposed on a path to introduce the air from the flow space "S1" to the supply space "S2" through the first opening 111, to filter the air in the flow space "S1" and supply the air to the supply space "S2".

In detail, the air filter 420 may be provided in the form of being spaced apart from the air inlet 15 while interposing the flow space "S1" therebetween. Accordingly, the air filter 420 does not need to be formed in size corresponding to the size of the air inlet 15, which is different from a wire mesh fitted in the conventional air inlet 15. In this case, the air filter 420 may be formed of a flame retardant material. For example, the air filter 420 may be a HEPA filter or a nonwoven filter, but is not limited thereto. The type of the air filter 420 may be determined depending on the quality of air in an area in which the water heater 10 is installed.

As described above, according to the present disclosure, when the filter assembly structure is used, the filter assembly 200 may be easily mounted or separated from the case 11 through the filter housing 100. Accordingly, when cleaning, replacement, or repair of the air filter 420 is necessary, the air filter 420 may be easily separated.

In particular, according to the present disclosure, when the filter assembly structure is used for the water heater 10, such as a boiler, the filter assembly 200 may be easily mounted or separated from the case 11 such that the state of the air filter 420 is frequently checked. Accordingly, the penetration of dust into the heat exchanger or burner inside the case 11 due to filter contamination is minimized, thereby improving the performance of the water heater 10 and extending the lifespan of the water heater 10.

According to the present disclosure, the water heater 10 may further include a sensing part 510 (see FIG. 4), a controller 520, and a display 530. The sensing part 510 may sense the state of the air filter 420, and the controller may control the operation of the water heater 10 based on the state of the air filter 420 sensed by the sensing part 510. For example, the controller 520 may stop the operation of the internal system of the water heater 10 when the degree of contamination of the air filter 420 sensed by the sensing part 510 exceeds a specific range. In this case, the operation of the water heater 10 may refer to all operations inside the water heater 10 including a combustion operation, or intake and exhaust operations.

The controller 520 may include a processor and a memory. The processor may include a microprocessor, such as a Field Programmable Gate Array (FPGA), an Application Specific Integrated Circuit (ASIC), and a Central Processing Unit (CPU). The memory may store control instructions that are the basis for generating control instructions in the processor. The memory may be a data store such as a hard disk drive (HDD), a solid state drive (SSD), a volatile medium, or a non-volatile medium.

The display 530 may display the state, which is sensed by the sensing part, of the air filter 420 and may display that it is time to replace the air filter 420 with new one when the operation of the water heater 10 is stopped by the controller, as the contamination degree of the air filter 420 exceeds the specific range. An operator may frequently recognize the state of the air filter 420 through the display, and may separate the filter assembly 200 and replace or clean the air filter 420, when the display 530 displays that it is time to replace the air filter 420. In detail, when the air filter 420 is replaced with new one, the front part of the filter housing 100 is separated, and the filter assembly 200 is separated from the filter housing 100. Then, the air filter 420 may be separated from the filter assembly 200 such that the air filter 420 is cleaned or replaced.

Meanwhile, the water heater 10 may further include the air supply adapter 20. The air supply adapter 20 may be coupled to the base panel 13 to supply air to the flow space "S1", and may have an inlet 21 to communicate with the air inlet 15. In detail, the air supply adapter 20 may be fitted into the air inlet 15.

In addition, the area of the air filter 420 may be greater than an area of the inlet 21. In detail, the air filter 420 may be disposed to form the flow space "S1" between the air inlet 15 and the air filter 420, and the area of the air filter 420 may be formed to be greater than the area of the inlet 21 of the air supply adapter 20. Accordingly, the filtering area through the air filter 420 is sufficiently ensured, and the flow of the air supplied into the supply space "S2" is blocked by the air filter 420 at the minimum, such that the air smoothly flows from the flow space "S1" to the supply space "S2".

For example, the area of the air filter 420 may be provided to be 8.9 times to 9.3 times the area of the inlet 21 of the air supply adapter 20. Accordingly, the area of the air filter 420 may be ensured such that air smoothly flows into the supply space "S2". In detail, the water heater 10, such as a boiler, may be significantly varied in performance depending on a mounting environment because the clogging degree of the water heater 10 by dust or foreign matters of the air filter 420 is significantly varied depending on the mounting environment. Accordingly, the area of the air filter 420 may be necessary to be appropriately ensured to prevent the air filter 420 from being clogged during the set lifespan (e.g., one year or two years) of the air filter 420. For example, the water heater having the same structure as in the illustrated embodiment may be safely used, as the air filter 420 is not clogged during the set lifespan when the area of the air filter 420 is formed to be 8.9 to 9.3 times the area of the inlet 21 of the air supply adapter 20. This may be recognized through a test. However, the area of the air filter 420 is not limited thereto, and may be variously changed depending on the mounting environment inside and outside the case 11 and specifications of the water heater 10.

Meanwhile, referring to FIGS. 2 and 3, the filter housing 100 may include a bottom plate 110, a front plate 120, a rear plate 130, and a side plate 140. Hereinafter, for the convenience of explanation, the direction in which the filter assembly 200 is inserted through the entrance 121 will be referred to as a "first direction", and the direction parallel to the inner surface of the base panel 13 and perpendicular to the first direction will be referred to a "second direction".

The bottom plate 110 may be spaced apart from the base panel 13 and may have a first opening 111 formed therein. The bottom plate 110 may be spaced apart from the base panel 13 to form the flow space "S1". As illustrated in FIG. 3, a plurality of first openings 111 may be arranged in the form of a grid, but the present disclosure is not limited thereto.

The front plate 120 may extend in a direction toward the base panel 13 from an end portion, which is positioned in a direction opposite to the first direction, of the bottom plate 110 and may have the entrance 121 formed therein. A first coupling boss 123 may be formed on the front plate 120 to assemble the filter assembly 200.

The rear plate 130 may extend toward the base panel 13 from an end portion, which is positioned in the first direction, of the bottom plate 110, and side plates 140 may extend toward the base panel 13 from opposite end portions, which are positioned in the second direction, of the bottom plate 110, respectively. The front plate 120, the rear plate 130, and the side plate 140 may form the flow space "S1" together with the bottom plate 110.

The side plate 140 may include a guide rib 141 that is spaced from the bottom plate 110, protrudes toward the flow space "S1", and longitudinally extends in the first direction.

To this end, a guide groove 143 may be formed between a guide rib 141 and a bottom plate 110, and an end portion, which is provided in the second direction, of the filter assembly 200 may be inserted into the guide groove 143 when the filter assembly 200 is inserted.

In detail, as a sidewall part 330, which is inserted into the guide groove 143, of the filter assembly 200 may slide, the portion of the sidewall part 330 is inserted into or withdrawn out of the filter housing 100. In this case, the guide rib 141 may include a curved-surface part 141a, which is formed at an end portion, which faces the front plate 120, of the guide rib 141 and more curved toward the base panel 13 as the guide rib 141 becomes closer to the front plate 120, such that the filter assembly 200 is easily introduced.

The size of the guide groove 143 in the end portion, which is positioned in the direction opposite to the first direction, of the guide rib 141 is more increased toward the front plate 120 by the curved-surface part 141a. Accordingly, as the sidewall part 330 of the filter assembly 200 is easily introduced into the guide groove 143, the filter assembly 200 may be easily assembled with the filter housing 100.

Meanwhile, in the filter housing 100, a flange part 150 may be formed at upper end portions of the front plate 120, the rear plate 130, and the side plate 140. The flange part 150 may be formed to make surface contact with the base panel 13, and the second coupling boss 151 may be formed on the flange part 150. The filter housing 100 may be coupled to the inner surface of the base panel 13, as a coupling member (e.g., a bolt) is coupled to the base panel 13 and the second coupling boss 151.

The filter housing 100 may further include a first packing member 160. The first packing member 160 may be coupled to the end portions of a front plate 120, a rear plate 130, and a side plate 140 to seal between the end portion of the filter housing 100 and the inner surface of the base panel 13. In more detail, the first packing member 160 is attached to the flange part 150 in contact with the inner surface of the base panel 13, thereby sealing between the base panel 13 and the flange part 150.

Accordingly, the entire portion of the air introduced through the inlet 21 of the air supply adapter 20 may be introduced into the flow space "S1". In other words, the air introduced through the inlet 21 is, due to the airtight action of the first packing member 160, prevented from being introduced to the supply space "S2" through a path other than the flow space "S1" in advance, such that the entire portion of the introduced air is fully filtered by the air filter 420.

Figure 4:
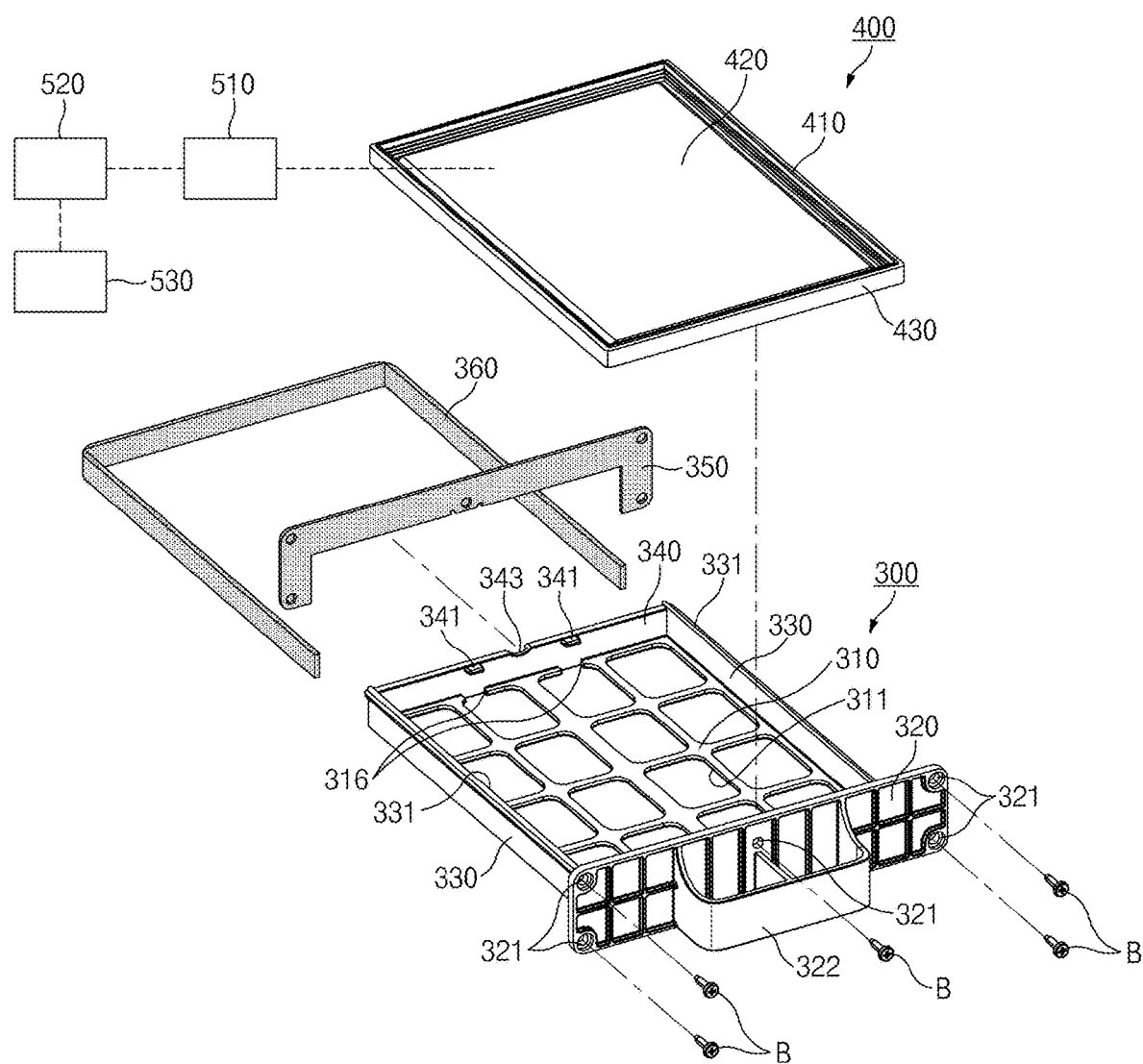
FIG. 4 is an exploded perspective view illustrating a filter assembly, according to the present disclosure.

Hereinafter, the structure of the filter assembly 200 will be described with reference to FIGS. 2 to 7. Referring to FIGS. 3 and 4, the filter assembly 200 may include a cover member 300 and a filter member 400.

The cover member 300 may have a second opening 311 formed to communicate with the first opening 111. Specifically, the cover member 300 includes a cover body 310, a cover part 320, a rear wall part 340, and a sidewall part 330.

The cover body 310 may have a second opening 311 and may be provided in contact with the bottom plate 110. In detail, the cover body 310 may be assembled in contact with the bottom plate 110 and provided to be spaced apart from the base panel 13. The second opening 311 may be formed in shape and number corresponding to the first opening 111, but is not limited thereto. In other words, the second opening 311 may be variously modified as long as the second opening 311 does not block the flow of air.

The cover part 320 may be coupled to the end portion, which is positioned in the direction opposite to the first direction, of the cover body 310, and provided to close the entrance 121 at the outside of the front plate 120 when the filter assembly 200 is coupled to the filter housing 100. In addition, the cover part 320 may be formed in the shape of a plate. A coupling hole 321 may be formed at a position, which corresponds to the position of the first coupling boss 123 in the front plate 120, of the cover part 320 and a coupling bolt "B" may be coupled to the coupling hole 321 and the coupling boss 123.

The rear wall part 340 may be provided at an end portion, which is positioned in the first direction, of the cover body 310 while facing the base panel 13. In addition, sidewall parts 330 may be connected to the cover part 320 and the rear wall part 340 between the cover part 320 and the rear wall part 340 and may be provided at opposite end portions, which are positioned in the second direction, of the cover body 310 while facing the base panel 13. In this case, the cover part 320, the rear wall part 340, and the sidewall part 330 may define an insertion space to insert the filter member 400. For example, the cover body 310, the cover part 320, the rear wall part 340, and the sidewall part 330 may be integrally formed.

The cover part 320 may further include a handle part 322 protruding in a direction opposite to a direction of facing the front plate 120. The operator may introduce or withdrawn the filter assembly 200 into or from the filter housing 100 by sliding the filter assembly 200 while gripping the handle part 322.

Figure 5:
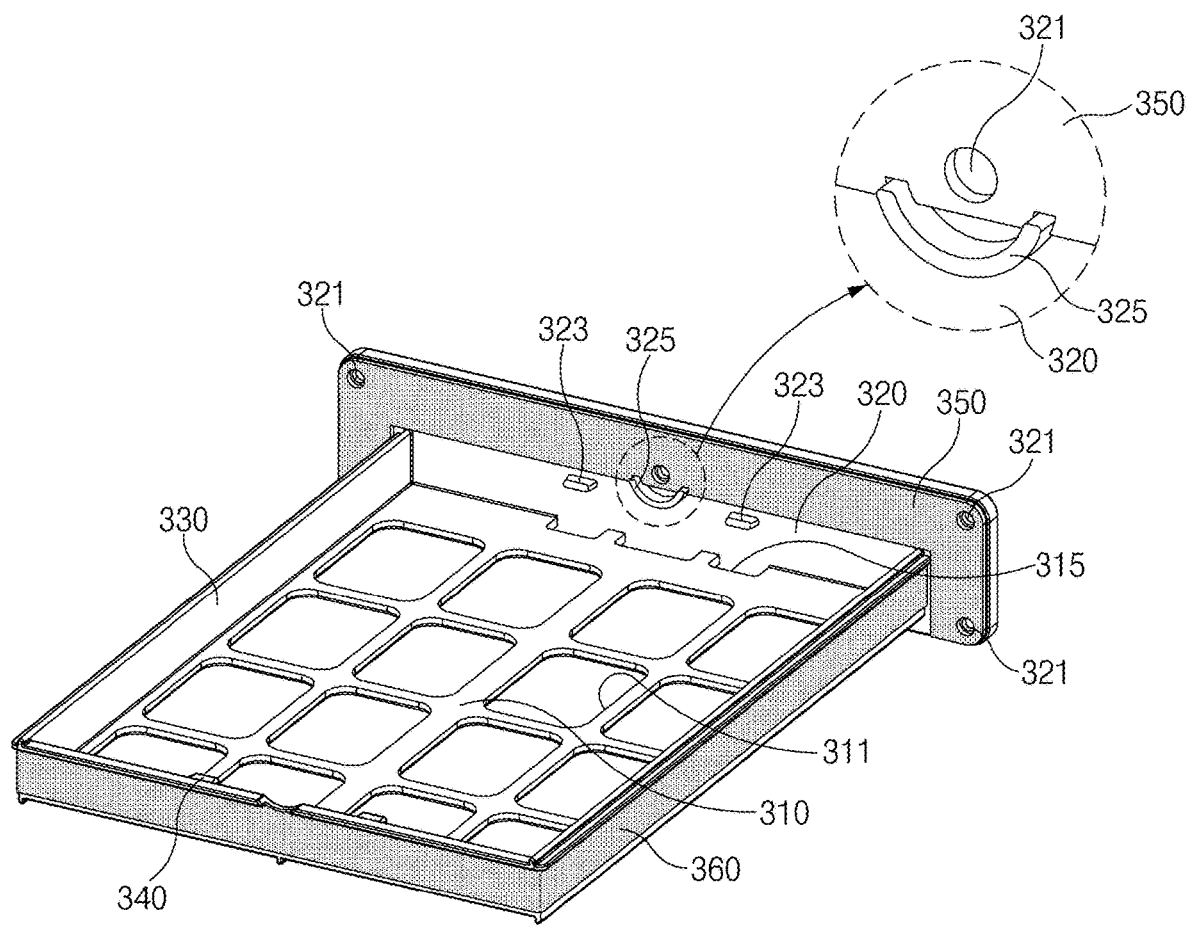
FIG. 5 is a perspective view illustrating a cover member, according to the present disclosure.

In addition, referring to FIG. 5, the cover part 320 may further include an erroneously-assembling preventing protrusion 325. The erroneously-assembling preventing protrusion 325 may protrude from a surface, which faces the front plate 120, may be provided inserted into the entrance 121 when the filter housing 100 is assembled with the filter assembly 200, and may be provided to be locked to the front plate 120 when the filter housing 100 is erroneously assembled with the filter assembly 200. In this case, the erroneously-assembling preventing protrusion 325 is not limited to that in the shape illustrated in FIG. 5, but may be modified in various shapes.

Figure 6:
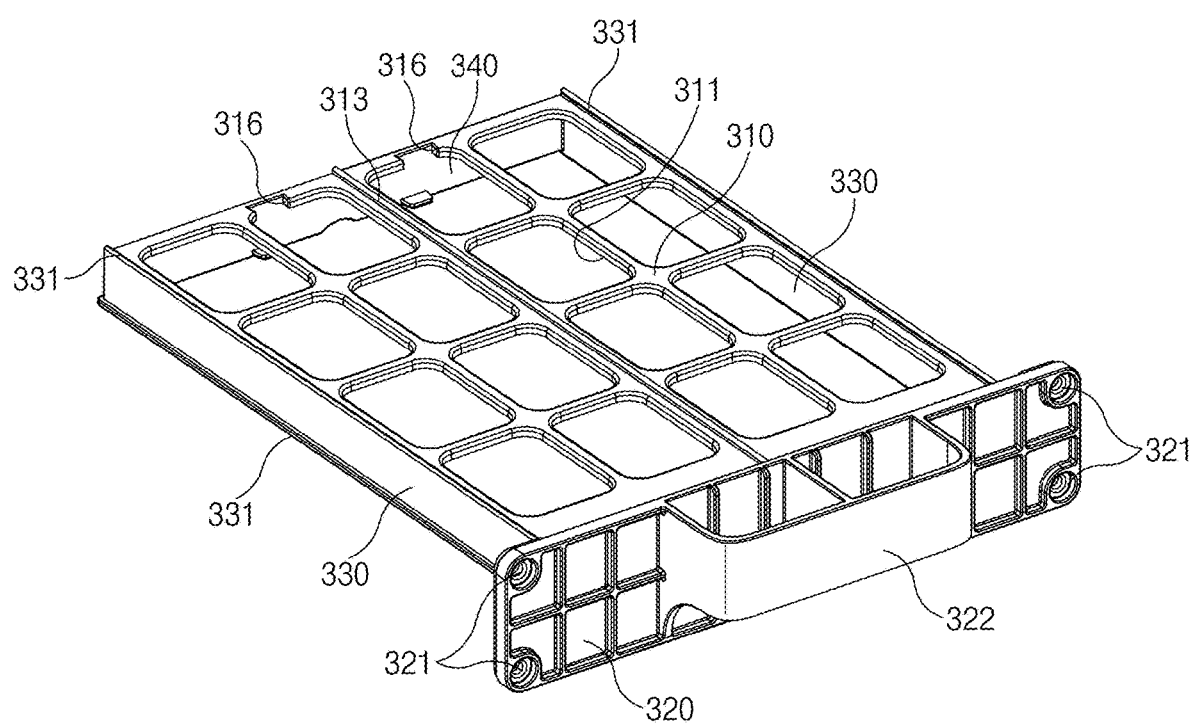
FIG. 6 is a perspective view illustrating the cover member of FIG. 5 when viewed from the bottom.

In detail, the erroneously-assembling preventing protrusion 325 is formed at a position to be locked to the front plate 120 when the filter assembly 200 is assembled, thereby preventing the front plate 120 from making close contact with the cover part 320. For example, as illustrated in FIG. 6, when the filter assembly 200, which is overturned, is introduced into the entrance 121, the erroneously-assembling preventing protrusion 325 is locked to the front plate 120 under the entrance 121. Accordingly, the operator may recognize the erroneously-assembling. The air filter 420 may be exactly mounted by the erroneously-assembling preventing protrusion 325.

Meanwhile, the filter member 400 may include an air filter 420 and a fixing frame 410 which is to fix the air filter 420 and is detachably assembled with the cover member 300.

Specifically, the fixing frame 410 may be formed in a shape corresponding to that of the cover member 300 and press-fitted into the insertion space. In addition, the fixing frame 410 may be formed in the shape of a rectangular frame. In addition, the air filter 420 may be attached to the fixing frame 410. When the filter member 400 and the cover member 300 are assembled, the fixing frame 410 is mounted to be in close contact with the cover member 300, thereby allowing the entire portion of the introduced air to pass through the air filter 420.

When replacing the air filter 420, after separating the filter assembly 200 from the filter housing 100, the filter member 400 is separated from the cover member 300, and a new filter member 400 is assembled with the cover member 300.

Specifically, the cover part 320 includes a first fitting rib 323 spaced apart from the cover body 310 and protruding toward the insertion space, and the rear wall part 340 includes a second fitting rib 341 spaced apart from the cover body 310 and protruding toward the insertion space. The fixing frame 410 may be inserted into the insertion space and fixed by the first fitting rib 323 and the second fitting rib 341. In other words, the fixing frame 410 may be fitted between the first fitting rib 323 (the second fitting rib 341) and the cover body 310.

In addition, the cover member 300 may include a gripping groove 343 and cut-out parts 315 and 316 such that the filter member 400 is easily separated from the cover member 300. The gripping groove 343 may be formed in the rear wall part 340 to be adjacent to the second fitting rib 341, and the cut-out parts 315 and 316 may be formed in the cover body 310 to be adjacent to the first fitting rib 323 or the second fitting rib 341. When separating the filter member 400, the filter member 400 is pressed in the direction of separating the filter member 400 through the cut-out parts 315 and 316, and the fixing frame 410 is lifted through the gripping groove 343, such that the filter member 400 is easily separated.

Meanwhile, the sidewall part 330 may further include a guide protrusion 331. The guide protrusion 331 may protrude from each surface facing the guide rib 141 and the bottom plate 110. Specifically, the guide protrusion 331 may longitudinally protrude in the first direction from the upper end portion and the lower end portion of the sidewall part 330. In addition, an anti-friction protrusion 313 may be formed on a bottom surface of the cover body 310.

When the filter assembly 200 is inserted into the filter housing 100 through the guide protrusion 331, that is, when the sidewall part 330 is inserted into the guide groove 143, the contact area between the sidewall part 330 and the bottom plate 110, and the contact area between the sidewall part 330 and the guide rib 141 are minimized to reduce friction, such that a sliding movement is easily performed. Accordingly, the filter assembly 200 may be easily assembled.

Figure 7:
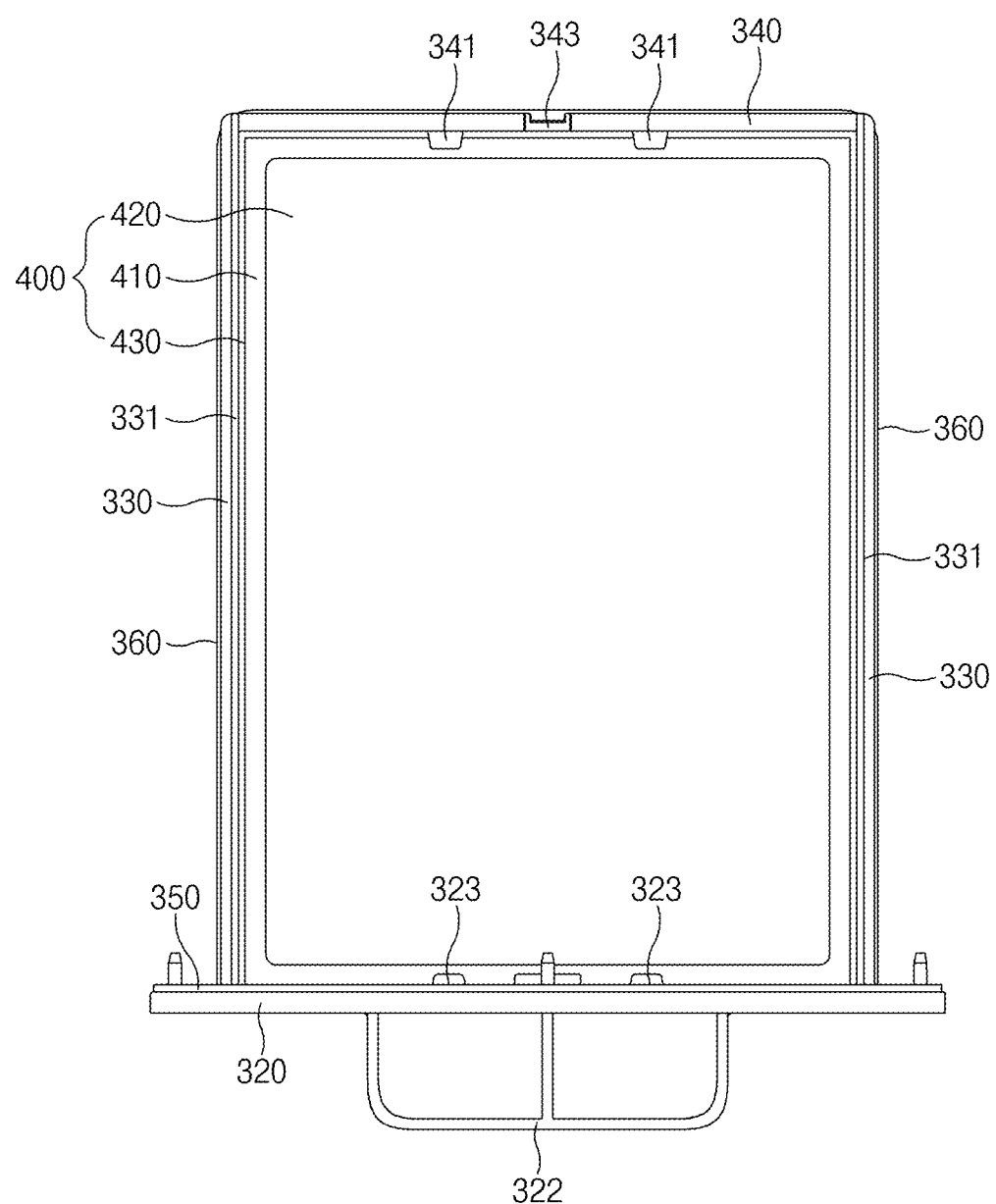
FIG. 7 is a plan view illustrating the filter assembly of FIG. 3 when viewed from the top.

Meanwhile, referring to FIGS. 3, 4, and 7, the filter assembly 200 is provided such that the entire portion of air introduced into the air inlet 15 is filtered through the air filter 420 by enhancing the airtight performance. To this end, the cover member 300 may include a second packing member 350 and a third packing member 360, and the filter member 400 may further include a fourth packing member 430.

The second packing member 350 may be coupled to a surface, which faces the front plate 120, of the cover part 320 to seal between the cover part 320 and the front plate 120. The third packing member 360 may be coupled to the outer surfaces of the rear wall part 340 and the sidewall part 330 to seal between the sidewall part 330 and the side plate 140, and between the rear wall part 340 and the rear plate 130. The space between the filter assembly 200 and the filter housing 100 may be effectively sealed by the second packing member 350 and the third packing member 360.

The fourth packing member 430 may be coupled to the outer surface of the fixing frame 410 to seal between the outer surface of the fixing frame 410 and the sidewall part 330, and to seal between the outer surface of the fixing frame 410 and the rear wall part 340. The space between the filter member 400 and the cover member 300 may be effectively sealed by the fourth packing member 430.

The air introduced into the flow space "S1" through the air inlet 15 may be supplied to the supply space "S2" only after passing through the air filter 420, due to the second to fourth packing members 350, 360, and 430 and the first packing member 160. Accordingly, the air is prevented from being supplied through a path other than the air filter 420 to prevent foreign matters or dust from being infiltrated. In this case, the materials of the first to fourth packing members 160, 350, 360, and 430 are not limited. For example, the first to fourth packing members 160, 350, 360, and 430 may include polyurethane foam (PU foam), and Ethylene Vinyl Acetate (EVA), but the present disclosure is not limited thereto.

As described above, according to the present disclosure, when the filter assembly structure is used, the filter assembly is easily mounted in the case or separated from the case, such that the air filter is easily separated when the air filter needs to be cleaned, replaced, or repaired.

In particular, according to the present disclosure, when the filter assembly structure is used for the water heater, such as a boiler, the filter assembly may be easily mounted or separated from the case such that the state of the air filter is frequently checked. Accordingly, the penetration of dust into the heat exchanger or burner inside the case due to filter contamination is minimized, thereby improving the performance of the water heater and extending the lifespan of the water heater.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A filter assembly structure comprising:
   a filter housing configured to be coupled to an inner surface of a base panel provided in a case of a water heater, and including a flow space formed together with the inner surface of the base panel and an entrance to communicate with the flow space;
   a filter assembly detachably assembled with the filter housing and including an air filter to filter air introduced through an air inlet provided in the base panel; and
   a first packing member having a shape of a closed loop to seal between an end portion of a flange part of the filter housing and the inner surface of the base panel,
   wherein the filter assembly is configured to be inserted into or separated from the filter housing through the entrance in a sliding manner and is provided so as to be overlapped with the air inlet when it is viewed along a direction in which the air inlet penetrates the base panel, and
   wherein the flange part has shape of a closed loop perpendicular to the air inlet,
   wherein the filter housing includes a first opening to supply the air, which is introduced into the flow space through the air inlet, to a supply space, when a space, which is provided outside the flow space, in an inner space of the case is referred to as the supply space,
   wherein the filter assembly includes:
      a cover member having a second opening formed to communicate with the first opening; and
      a filter member including the air filter, and a fixing frame which is to fix the air filter and detachably assembled to the cover member,
   wherein the cover member includes:
      a cover body having the second opening and provided to make contact with the bottom plate; and
      a rear wall part extending toward the base panel at a distal end portion of the cover body; and
   wherein the cover member further includes:
      a gripping groove formed to be recessed in the rear wall part; and
      cut-out parts formed to be recessed in the cover body.

2. The filter assembly structure of claim 1, wherein the air filter is disposed on a path to introduce the air from the flow space to the supply space through the first opening, to filter the air in the flow space and supply the air to the supply space.

3. The filter assembly structure of claim 2, wherein the water heater further include:
   an air supply adaptor including an inlet to communicate with the air inlet, and coupled to the base panel to supply the air to the flow space, and
   wherein an area of the air filter is formed to be greater than an area of the inlet such that the air smoothly flows to the supply space from the flow space.

4. The filter assembly structure of claim 3, wherein the air filter has an area which is 8.9 times to 9.3 times an area of the inlet of the air supply adapter.

5. The filter assembly structure of claim 2, wherein the filter housing includes:
   a bottom plate spaced apart from the base panel and having the first opening;
   a rear plate extending toward the base panel from a distal end portion of the bottom plate in a first direction;
   a front plate extending toward the base panel from a distal end portion of the bottom plate in a direction opposite to the first direction, the entrance being formed through the front plate; and
   side plates extending toward the base panel from a distal end portion of the bottom plate in a second direction and a distal end portion of the bottom plate in a direction opposite to the second direction, and configured to form the flow space together with the rear plate and the front plate, when a direction in which the filter assembly is inserted through the entrance is referred to as the first direction, and a direction parallel to the inner surface of the base panel and perpendicular to the first direction is referred to as the second direction.

6. The filter assembly structure of claim 5, wherein each of the side plates includes:
   a guide rib spaced from the bottom plate, protruding toward the flow space, and longitudinally formed in the first direction, and
   wherein a guide groove is formed between the guide rib and the bottom plate, a distal end portion of the filter assembly in the second direction or the direction opposite to the second direction being inserted into the guide groove when the filter assembly is inserted.

7. The filter assembly structure of claim 6, wherein the guide rib includes:
   a curved-surface part formed at an end portion, which faces the front plate, of the guide rib and bent toward the base panel, such that the filter assembly is easily introduced.

8. The filter assembly structure of claim 5, wherein the first packing member is coupled to end portions of the rear plate, the front plate, and the side plates.

9. The filter assembly structure of claim 5, wherein the cover member further includes:

a cover part coupled to a distal end portion of the cover body in the direction opposite to the first direction, provided to close the entrance at an outside of the front plate, when the filter assembly is coupled to the filter housing, and provided in a plate shape.

10. The filter assembly structure of claim 9, wherein the cover member further includes:
sidewall parts extending toward the base panel at a distal end portion of the cover body in the second direction and a distal end portion of the cover body in the direction opposite to the second direction and connected to the cover part and the rear wall part, and
wherein the cover part, the rear wall part, and the sidewall parts form an insertion space to insert the filter member.

11. The filter assembly structure of claim 10, wherein the cover part includes a first fitting rib spaced apart from the cover body and protruding toward the insertion space,
wherein the rear wall part includes a second fitting rib spaced apart from the cover body and protruding toward the insertion space, and
wherein the fixing frame is inserted into the insertion space and fixed by the first fitting rib and the second fitting rib.

12. The filter assembly structure of claim 10, wherein the cover member further includes:
a third packing member coupled to outer surfaces of the rear wall part and the sidewall parts to seal between the rear wall part and the rear plate and between the sidewall parts and the side plates.

13. The filter assembly structure of claim 10, wherein the filter member further includes:
a fourth packing member coupled to an outer surface of the fixing frame to seal between the outer surface of the fixing frame and the sidewall parts and between the outer surface of the fixing frame and the rear wall part.

14. The filter assembly structure of claim 9, wherein the cover part further includes:
an erroneously-assembling preventing protrusion protruding from a surface of the cover part, which faces the front plate, configured to be inserted into the entrance when the filter housing is assembled with the filter assembly, and configured to be locked to the front plate when the filter housing is erroneously assembled with the filter assembly.

15. The filter assembly structure of claim 9, wherein the cover part further includes:
a handle part protruding in a direction opposite to a direction of facing the front plate.

16. The filter assembly structure of claim 9, wherein the cover member further includes:
a second packing member coupled to a surface, which faces the front plate, of the cover part to seal between the cover part and the front plate.

17. The filter assembly structure of claim 10, wherein each of the side plates includes:
a guide rib protruding toward the flow space to form a guide groove together with the bottom plate, and longitudinally formed in the first direction, and
wherein each of the sidewall parts includes:
a guide protrusion configured to be inserted into the guide groove and protruding from each surface facing the guide rib and the bottom plate such that a contact area between the bottom plate and the guide rib is minimized when the filter assembly is inserted into the filter housing.

18. A water heater comprising:
a case having an inner space, and including a base panel to cover an upper portion of the inner space, wherein the base panel includes an air inlet formed through the base panel such that air is introduced into the inner space;
a filter housing coupled to an inner surface of the base panel and including a flow space formed together with the inner surface of the base panel and an entrance to communicate with the flow space;
a filter assembly detachably assembled with the filter housing and including an air filter to filter air introduced through the air inlet; and
a first packing member having a shape of a closed loop to seal between an end portion of a flange part of the filter housing and the inner surface of the base panel,
wherein the filter assembly is configured to be inserted into the filter housing or separated from the filter housing through the entrance in a sliding manner and is provided so as to be overlapped with the air inlet when it is viewed along a direction in which the air inlet penetrates the base panel, and
wherein the flange part has shape of a closed loop perpendicular to the air inlet, and
wherein the filter housing includes a first opening to supply the air, which is introduced into the flow space through the air inlet, to a supply space, when a space, which is provided outside the flow space, in an inner space of the case is referred to as the supply space, and
wherein the filter assembly includes:
a cover member having a second opening formed to communicate with the first opening; and
a filter member including the air filter, and a fixing frame which is to fix the air filter and detachably assembled to the cover member, and
wherein the cover member includes:
a cover body having the second opening and provided to make contact with the bottom plate; and
a rear wall part extending toward the base panel at a distal end portion of the cover body; and
wherein the cover member includes:
a gripping groove formed to be recessed in the rear wall part; and
cut-out parts formed to be recessed in the cover body.

19. The water heater of claim 18, further comprising:
a sensing part to sense a state of the air filter;
a controller to control an operation of the water heater based on the state, which is sensed by the sensing part, of the air filter; and
a display to display the state of the air filter, which is sensed by the sensing part and display that a time to replace the air filter with a new air filter comes when the operation of the water heater is stopped by the controller, as a contamination degree of the air filter exceeds a specific range.

* * * * *